July 5, 1949.  E. A. McCARDELL  2,474,981
GUARD AND FENCE DEPRESSOR FOR POSTHOLE DIGGERS
Filed July 17, 1946
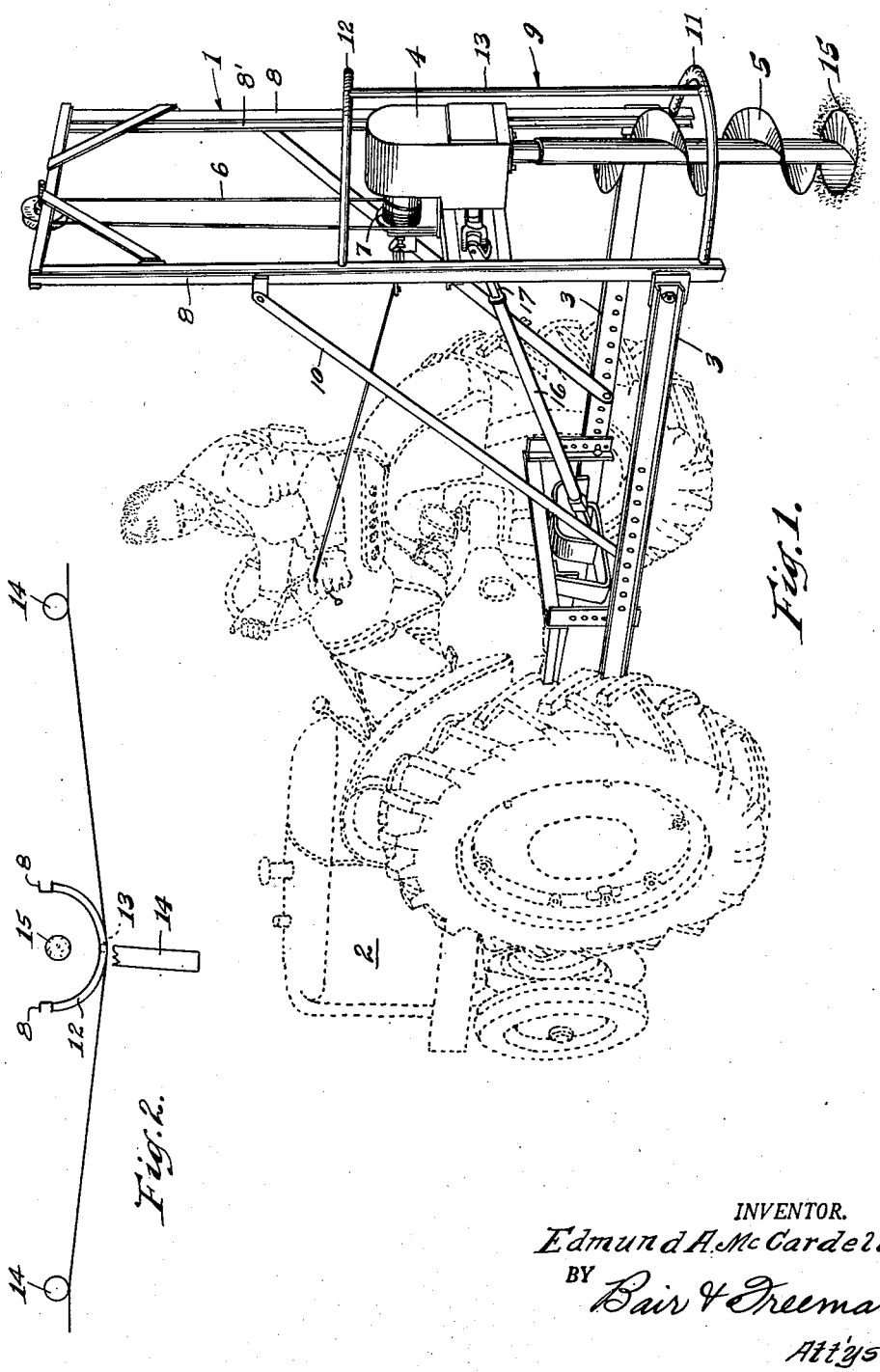
INVENTOR.
Edmund A. McCardell.
BY Bair & Freeman
Att'ys.

Patented July 5, 1949

2,474,981

UNITED STATES PATENT OFFICE 2,474,981

GUARD AND FENCE DEPRESSOR FOR POSTHOLE DIGGERS

Edmund A. McCardell, Newton, Iowa, assignor to Winpower Manufacturing Company, Newton, Iowa, a corporation of Iowa Application July 17, 1946, Serial No. 684,331

4 Claims. (Cl. 255—19)

This invention relates to a guard and fence depressor for post hole diggers of the type used on farms, highways and the like for digging holes for posts.

It is an object of the invention to provide a device which protects the operator and others from the sharp rotating edges of the auger of a post hole digger which is attached to a tractor or similar vehicle, which device also serves the function of pushing back an existing line of fence or guard rail when the tractor operator so desires.

It is another object of the invention to provide a guard for the auger of a post hole digger, which enables the operator of the tractor or similar vehicle on which the digger is mounted to back the vehicle into a line of fencing, pushing it back so that a post hole may be dug directly in line with the fence to replace a pole that may have become broken or rotted out in the fence row.

It is a further object of the invention to provide a guard for a post hole digger which is sufficiently strong to break down parts of existing fences.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 illustrates the improved guard and fence depressor for post hole diggers associated with a tractor, the tractor and operator being shown in dotted lines; and Figure 2 illustrates diagrammatically the operation of the device.

Referring specifically to the drawing, a post hole digger, generally indicated by the numeral 1, is attached to a tractor 2 by suitable spaced horizontally extending framework 3. The post hole digger 1 comprises a gear box 4 containing suitable gears (not shown) for rotating a digging auger 5 and for raising and lowering the auger through a cable 6 which is wound on a rotating drum 7. Two upright frame members 8 are supported by the frame 3 and provide trackways 8' affording vertical sliding movement of the auger 5 and gear box 4. Braces 10 extend from frame 3 to frame 8. The frame members 8 terminate at their lower ends a short distance from the ground. A universally mounted drive shaft including telescopically assembled members 16 and 17 is connected to a power take off (not shown) of the tractor and to the gear box 4 for rotating the auger 5 and the drum 7.

Secured to the upright frame members 8 is a guard and fence depressor, generally indicated at 9, which comprises a half hoop 11 of strong steel tubing preferably welded to the two upright frame members 8. A second half hoop 12 of strong steel tubing is welded to the two upright frame members 8 intermediate the ends thereof. The half hoops 11 and 12 are of substantially the same size and configuration and are of sufficient size to encompass one side of the gear box 4 and auger 5. A heavy vertical steel tube 13 is welded to the half hoops 11 and 12 at the rearmost portions thereof.

From the foregoing, it will be apparent that when the operator so desires, he may back the tractor into a line of fence or a rotted or broken post 14 and push it out of the way by means of guard 9. The tractor may then be moved to that auger 5 will bore a hole 15 in a direct line with the rest of the fence. Furthermore, the guard 9 serves to protect persons from the sharp cutting edges of the auger 5. The bottom half hoop 11 is low enough to push back or break off very short fence sections and the vertical member 13 protects the gear box 4 and auger 5 and also serves, with the half hoops 11 and 12, to push back fence or posts. One operator may, therefore, both push back fence and bore post holes without leaving his seat on the tractor.

Some changes may be made in the construction and arrangement of the parts of my guard and fence depressor for post hole diggers without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A post hole digger for mounting on a vehicle comprising spaced horizontal frame members secured to said vehicle and extending rearwardly therefrom, a vertically extending cutter frame secured to said horizontal frame member, a vertically movable cutter member carried by said cutter frame, and means carried by said cutter frame for moving said cutter member, said cutter frame including spaced vertical members, rearwardly extending spaced curved guard members enclosing said cutter member and a vertical member connected to said curved members at the rearmost portion thereof.

2. A post hole digger for mounting on a vehicle comprising spaced horizontal frame members secured to said vehicle and extending rearwardly therefrom, a vertically extending cutter frame secured to said horizontal frame members, a vertically movable cutter member carried by said frame members and rotating about a vertical axis, means carried by said cutter frame for feeding said cutter member vertically, said cutter frame including spaced vertical members, rearwardly extending spaced bowed guard members enclosing said cutter member, and a vertical member connected to said bowed members at the rearmost portion thereof and in substantially vertical alignment with the axis of said cutter member.

3. A post hole digger for mounting on a vehicle, comprising spaced horizontal frame members secured to said vehicle and extending rearwardly therefrom, a vertically extending cutter frame secured to said horizontal frame members, a vertically movable cutter member carried by said cutter frame, and means carried by said cutter frame for moving said cutter member, said cutter frame including spaced vertical members, rearwardly extending spaced curved guard members enclosing said cutter member and a vertical member connected to said curved members at the rearmost portion thereof, one of said curved members being located at substantially the point of connection between said horizontal frame members and the cutter frame and the other curved member being located above the first mentioned curved member and intermediate the ends of the cutter frame.

4. A post hole digger for mounting on a vehicle, comprising spaced horizontal frame members secured to said vehicle and extending rearwardly therefrom, a vertically extending cutter frame secured to said horizontal frame members and having trackways extending therealong, a vertically movable cutter member carried by said cutter frame, means carried by said cutter frame connected to said cutter member and movable along said trackways for feeding said cutter member, said cutter frame including spaced vertical members, rearwardly extending spaced curved guard members enclosing said cutter member and a vertical member connected to said curved members at the rearmost portion thereof.

EDMUND A. McCARDELL.

REFERENCES CITED

The following references are of record in the file of this patent:

UNITED STATES PATENTS

| Number | Name | Date |
|---|---|---|
| 1,602,375 | Gibson | Oct. 5, 1926 |
| 1,643,549 | Donnelly et al. | Sept. 27, 1927 |
| 1,868,081 | Stoop | July 19, 1932 |
| 2,154,732 | Dahl | Apr. 18, 1939 |
| 2,418,601 | Richards | Apr. 8, 1947 |